United States Patent [19]
Bianchini, Jr.

[11] Patent Number: 5,325,518
[45] Date of Patent: Jun. 28, 1994

[54] ADAPTIVE DISTRIBUTED SYSTEM AND METHOD FOR FAULT TOLERANCE

[75] Inventor: Ronald P. Bianchini, Jr., Pittsburgh, Pa.

[73] Assignee: Carnegie Mellon University, Pittsburgh, Pa.

[21] Appl. No.: 679,446

[22] Filed: Apr. 2, 1991

[51] Int. Cl.⁵ .............................................. G06F 11/00
[52] U.S. Cl. ................................... 395/575; 371/16.1; 371/20.1; 371/20.5
[58] Field of Search ................... 371/20.1, 16.1, 20.5; 340/826, 827; 370/13, 14, 16, 54; 364/200 MS File, 900 MS File; 395/575

[56] References Cited

PUBLICATIONS

Ebihara, Y. et al., "Fault Diagnosis and Automatic Reconfiguration for a Ring Subsystem", *Computer Networks and ISDN Systems*, North-Holland, 1985, pp. 97–109.

Schoch, J. et al., "The 'Worm' Programs-Early Experience with a Distributed Computation", *Communications of the ACM*, vol. 25, No. 3, Mar. 1982, pp. 172–180.

Hakimi, S. et al., "On Adaptive System Diagnosis", *IEEE Transactions on Computers*, vol. C-33, No. 3, Mar. 1984, pp. 234–240.

Armstrong, C. et al., "A Fault-Tolerant Multimicroprocessor-Based Computer System for Space-based Signal Processing", *IEEE Micro*, Dec. 1984, pp. 54–65.

Shombert, L. et al., "Using Redundancy for Concurrent Testing and Repairing of Systolic Arrays", *Fault Tolerant Computing Symposium*-17, 1987, pp. 244–249.

*Primary Examiner*—Stephen M. Baker
*Attorney, Agent, or Firm*—Reed Smith Shaw & McClay

[57] ABSTRACT

An adaptive distributed system and method for fault tolerance. The system is comprised of a network including N nodes, where N is an integer greater than or equal to 3 and each node is able to execute an algorithm in communication with the network. Each of the N nodes is in communication with at least one other node by way of the network. In addition, each node has a device for testing whether a node is in a desired state or an undesired state and for choosing which node to test based on given circumstances at a corresponding time. The method comprises the steps of using a tester node to choose and test another node to determine whether the other node is in a desired state or undesired state. Thereafter, if the node being tested is in a desired state, the tester node transmits an activation signal to the tested node to cause same to become the next tester node. These steps are then repeated on at least one other node at another predetermined location until a processor in a desired state is tested.

3 Claims, 7 Drawing Sheets

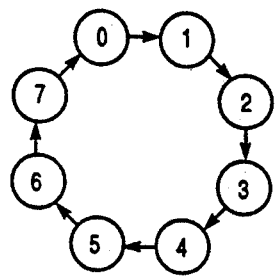
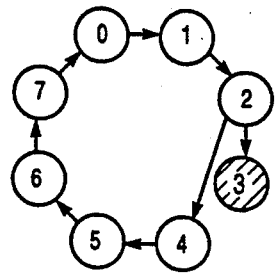
FIG. 5a  FIG. 5b
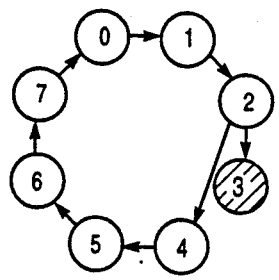
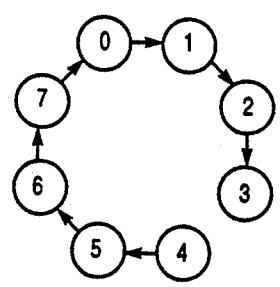
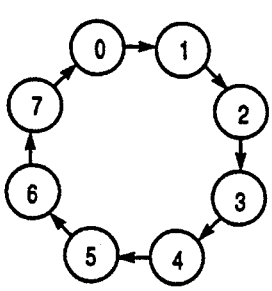
FIG. 6a  FIG. 6b  FIG. 6c
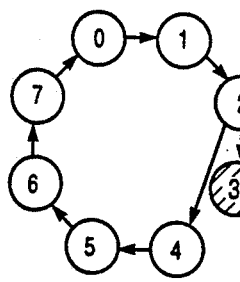
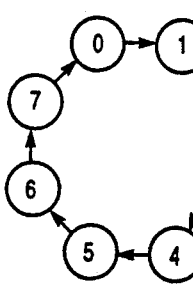
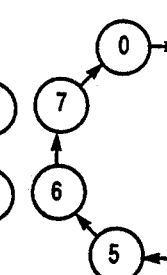
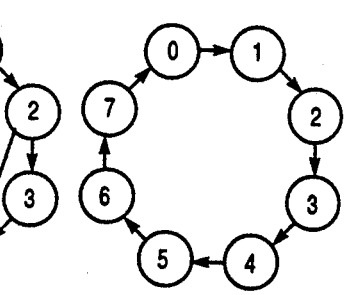
FIG. 7a  FIG. 7b  FIG. 7c  FIG. 7d

ADAPTIVE DISTRIBUTED SYSTEM AND METHOD FOR FAULT TOLERANCE

FIELD OF THE INVENTION

The present invention is related to system-level diagnosis. More specifically, the present invention is related to an adaptive distributed system and method for fault tolerance in a network of nodes.

BACKGROUND OF THE INVENTION

There has been significant theoretical research in the area of system level diagnosis. Necessary conditions for system level diagnosability were given in 1967 by Preparata, Metze and Chien; F. P. Preparata, G. Metze and R. T. Chien. On the Connection Assignment Problem of Diagnosable Systems. *IEEE Transactions on Electronic Computing* EC-16 (12):848-854, December, 1967, and characterized in 1974 by Hakimi and Amin; S. L. Hakimi and A. T. Amin. Characterization of Connection Assignment of Diagnosable Systems. *IEEE Transactions on Computers* C-23(1), January, 1974. Since that time, there has been a large body of further theoretical developments; E. Kreutzer and S. L. Hakimi. System-Level Fault Diagnosis: A Survey. *Euromicro Journal* 20(4,5):323-330, May 1987, including the diagnosability of new failure modes; C. L. Yang and G. M. Masson. Hybrid Fault Diagnosability with Unreliable Communication Links. In *Fault-Tolerant Computing Systems*, pages 226-231. IEEE, July, 1986, and the development of diagnosis algorithms; S. H. Hosseini, J. G. Kuhl and S. M. Reddy. A Diagnosis Algorithm for Distributed Computing Systems with Dynamic Failure and Repair. *IEEE Transactions on Computers* C-33(3):223-233, March, 1984. Recently, a distributed diagnosis algorithm has been implemented and presented in R. P. Bianchini Jr., K. Goodwin and D. S. Nydick. Practical Application and Implementation of Distributed System-Level Diagnosis Theory. In *Proceedings of the Twentieth International Symposium on Fault-Tolerant Computing*, pages 332-339. IEEE, June, 1990.

The present invention involves a new distributed diagnosis algorithm, Adaptive DSD, and its implementation. The framework of Adaptive DSD is modeled after the NEW_SELF distributed self-diagnosable algorithm given by Hosseini, Kuhl and Reddy; S. H. Hosseini, J. G. Kuhl and S. M. Reddy. A Diagnosis Algorithm for Distributed Computing Systems with Dynamic Failure and Repair. *IEEE Transactions on Computers* C-33(3):223-233, March, 1984. In that work it is assumed that a node is capable of testing a fixed set of neighboring nodes. It is further assumed that fault-free nodes pass on results of these tests to other nodes in the network. No assumption is made about faulty nodes, which may distribute erroneous test results. Diagnostic messages containing test results flow between neighboring nodes and reach nonneighboring nodes through intermediate nodes. Each node determines independent diagnosis of the network utilizing the diagnostic messages it receives. The NEW_SELF algorithm was extended in R. P. Bianchini Jr., K. Goodwin and D. S. Nydick. Practical Application and Implementation of Distributed System-Level Diagnosis Theory. In *Proceedings of the Twentieth International Symposium on Fault-Tolerant Computing*, pages 332-339. IEEE, June, 1990, by addressing the resource limitations of actual distributed systems. This new algorithm, called EVENT_SELF, utilizes "event driven" diagnostic messages to reduce the resource overhead of the NEW_SELF algorithm.

The Adaptive DSD algorithm differs considerably from the SELF algorithms in that the testing structure is adaptive and determined by the fault situation. The algorithm handles node failures and repairs. Link failures are not considered in this implementation. The Adaptive DSD algorithm also differs from the SELF algorithms in that the number of nodes in the fault set is not bounded. The SELF algorithms bound the number of allowable faulty nodes to a predefined limit, t. In the Adaptive DSD algorithm, the fault set can include any number of nodes, including all but one as faulty. The remaining fault-free node will correctly diagnose all the other nodes as faulty.

The algorithm is optimal in terms of the total number of tests required. For correct diagnosis, each node must be tested by at least one fault-free node. In the Adaptive DSD algorithm each node is tested by exactly one fault-free node. Each node typically tests one other node, but can be required to test multiple nodes, of which one must be fault-free. In addition, the algorithm requires the maintenance of less complex data structures than the SELF algorithms. All diagnostic information is contained in a single data structure stored at each node.

SUMMARY OF THE INVENTION

The present invention pertains to an adaptive distributed system for fault tolerance. The system is comprised of a network. The system is also comprised of N nodes, where N is greater than or equal to 3 and is an integer, and a node is able to execute an algorithm in communication with the network. Each of the N nodes is in communication with at least one other node by way of the network. Each node has means for testing whether a node is in a desired state or an undesired state and for choosing which node to test based on given circumstances at a corresponding time.

The present invention also pertains to a method for determining whether N nodes of a network, where N is greater than or equal to 3 and is an integer are in a desired or undesired state. The method comprises the step of testing with the tester node another node to determine whether the other node is in a desired state or undesired state. Next, there is the step of providing an activation signal to the node being tested if it is in a desired state to cause it to become the tester node. Then there is the step of repeating the above steps on at least one other node at another predetermined location, if the processor tested is in an undesired state until a processor in a desired state is tested.

BRIEF DESCRIPTION OF THE DRAWINGS

In the accompanying drawings, the preferred embodiments of the invention and preferred methods of practicing the invention are illustrated in which:

FIGS. 5a and 5b are schematic representations of an event sequence for failing $N_3$.

FIGS 6a, 6b, and 6c are schematic representations of a possible event sequence for repaired $N_3$.

FIGS. 7a, 7b, 7c, and 7d are schematic representations of a modified event sequence for repaired $N_3$.

DESCRIPTION OF THE PREFERRED EMBODIMENT

Figure 1A:
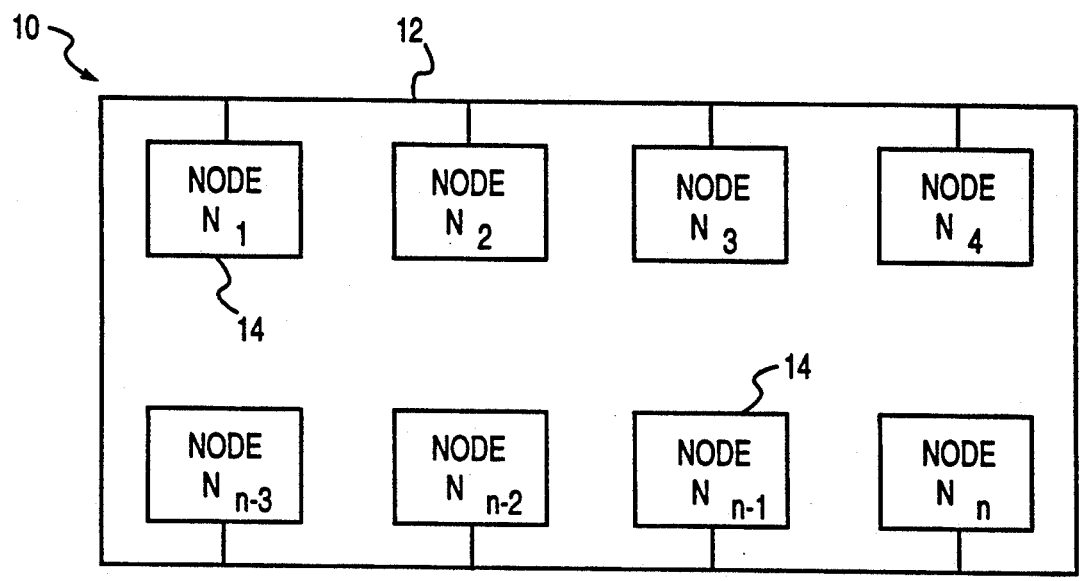
FIGS. 1a and 1b are block diagrams of an adaptive distributed system and method for fault tolerance.
Figure 1B:
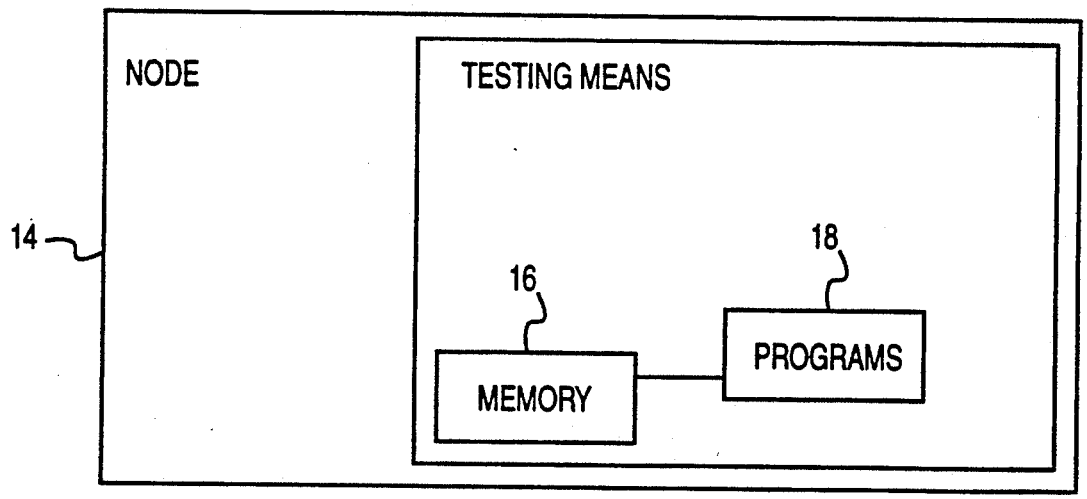

Referring now to the drawings wherein like reference numerals refer to similar or identical parts throughout the several views, and more specifically to FIG. 1 thereof, there is shown a schematic representation of an adaptive distributed system 10 for fault tolerance. The system 10 is comprised of a network 12. The system 10 is also comprised of N nodes, which are preferably processors 14, where N is greater than or equal to 3 and is an integer and a node is able to execute an algorithm, in communication with the network 12. Each of the N processors 14 are in communication with at least one other processor 14 by way of the network 12. Preferably, each processor 14 is in communication with every other processor 14. Each processor 14 has means for testing whether another processor 14 is in a desired state or an undesired state and for choosing which processor 14 to test based on given circumstances at a corresponding time. Preferably, the testing means tests another processor 14 and chooses which other processor 14 to test. A desired state can be, for example, that the processor is operating within the acceptable bounds of error, and an undesired state can be the processor is operating outside the bounds of acceptable error. Preferably, the testing means includes a memory 16. The testing means preferably also includes a computer program 20 stored in the memory 18. The computer program 20 chooses at least one other processor 14 to test, and also tests the other processor 14.

Preferably, the program 20 is comprised of the computer implemented steps of first testing whether another processor 14 at a predetermined position in the network 12 is in a desired state or an undesired state. Then there is the step of providing an activation signal to the processor 14 being tested if it is in a desired state to cause it to activate its computer program. Then, there can additionally be the step of providing a signal to the other processor 14 corresponding to the state of the processor 14 tested if it is in an undesired state. Next, there is the step of repeating the above steps on at least one other processor 14 at another predetermined location if the processor 14 tested is in an undesired state until a processor at a desired state is tested. It should be noted that from 1 to N of the processors 14 can be tested with the testing means the processors 14 of the network in parallel.

The first testing step can include the step of testing another processor 14 to the immediate clockwise location on the network 12 of the testing processor 14. The second testing step can also include the step of testing another processor 14 to the immediate clockwise location of the last processor 14 tested.

In general, a diagnosis system S consists of the triple (V(S), E(S), T(S)), where:

$$V(S) = [n_0, n_1, \ldots, n_{N-1}]$$

The set of nodes or vertices of system S, where $n_i$ represents the i-th node of an N node distributed system, $0 \leq i \leq N-1$.

$$E(S) = [\ldots [n_i, n_j] \ldots]$$

The set of edges of system S, where $[n_i, n_j]$ represents an undirected edge, or communication path between nodes $n_i$ and $n_j$. Initially, S is assumed to be fully edge connected, or $E(S) = E(K_N)$. It is shown below that the number of edges required in E(S) can be significantly reduced.

$$T(S) = [\ldots (n_i, n_j) \ldots]$$

The set of tests of system S, where $(n_i, n_j)$ represents a directed edge, or test, from $n_i$ to $n_j$. Note that T(S) is a directed subset of E(S), such that if $(n_i, n_j) \in E(S)$.

Since T(S) is a directed subset of E(S), it is implied that if a node is able to test another node, then it can also communicate with that node. Previous work on distributed diagnosis fixes T(S) at system specification. In this work, T(S) is adaptive and varies at algorithm execution according to the fault situation. A fault situation F(S) defines the fault condition of the system:

$$F(S) = [s_0, s_1, \ldots, s_{N-1}]$$

The fault condition of system S, where $s_i$ is assigned one of [faulty, fault-free]. The variable $s_i$ represents the state of node $n_i$.

Test results are assumed to fall within the PMC or $\mp$*symmmetric invalidation*" model of system diagnosis; F. P. Preparata, G. Metze and R. T. Chien. On the Connection Assignment Problem of Diagnosable Systems. *IEEE Transactions on Electronic Computing* EC-16(12):848–854, December, 1967. In this model, the results of tests performed by fault-free nodes are accurate, and the results of tests performed by faulty nodes may not be accurate and can lead to erroneous results. Test results are one of [faulty, fault-free]. For a node $n_x$ testing $n_y$, the test result equals $s_y$ if $n_x$ is fault-free. If $n_x$ is faulty, then the test result is arbitrary. The algorithm presented in S. H. Hosseini, J. G. Kuhl and S. M. Reddy. A Diagnosis Algorithm for Distributed Computing Systems with Dynamic Failure and Repair. *IEEE Transactions on Computers* C-33(3):223–233, March, 1984, ensures information accuracy by restricting the flow of information between fault-free nodes. Specifically, a node will only accept information from other nodes that it tests and determines to be fault-free. As evident by this specification, valid diagnostic information flows between nodes in the reverse direction of tests between the nodes.

The algorithm presented herein utilizes the following testing scheme as described in S. H. Hosseini, J. G. Kuhl and S. M. Reddy. A Diagnosis Algorithm for Distributed Computing Systems with Dynamic Failure and Repair. *IEEE Transactions on Computers* C-33(3):223-233, March, 1984:

1. $n_i$ tests $n_j$ as fault-free,
2. $n_i$ receives diagnostic information from $n_j$,
3. $n_i$ tests $n_j$ as fault-free,
4. $n_i$ assumes the diagnostic information received in Step 2 is valid.

This scheme requires $n_j$ to remain fault-free between the tests executed at Steps 1 and 3 above. The following assumption is required of a diagnosis system S for the above scheme to execute correctly:

Assumption: A node cannot fail and recover from that failure in an undetected fashion, during the interval between two tests by another node.

This can be accomplished by either recording and storing fault events until the second test occurs at Step 3 or by ensuring that the testing interval is small enough to detect all failures.

Figure 2:
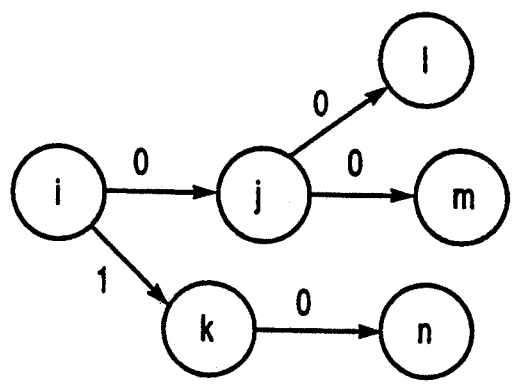
FIG. 2 is a schematic representation of forward fault-free paths from $N_i$.

Given the above definitions and assumptions a node can successfully identify other fault-free nodes by utilizing forward paths of fault-free test results. See FIG. 2. Test results, identified by arcs, are labeled "0" if the result is fault-free and "1" if the result is faulty. Node $n_i$ tests both $n_j$ and $n_k$ and determines $n_j$ to be fault-free and $n_k$ to be faulty. Since $n_i$ determines $n_j$ to be fault-free, $n_i$ can utilize diagnostic information from $n_j$ which includes test results performed by $n_j$. Thus $n_i$ can correctly diagnose $n_l$ and $n_m$ as fault-free without directly testing those nodes. Since $n_i$ determines $n_k$ to be faulty, $n_i$ cannot diagnose the state of $n_n$. The algorithm presented below utilizes forward fault-free paths in this manner to identify fault-free nodes.

An example of the data structure required by the Adaptive DSD algorithm is shown in Table 1. The array TESTED_UP$_x$ is maintained at each node $n_x$. TESTED_UP$_x$ contains N elements, indexed by node identifier, i, as TESTED_UP$_x$[i], for $0 \leq i \leq N-1$. Each element of TESTED_UP$_x$ contains a node identifier. The entry TESTED_UP$_x$[i]=j indicates that $n_x$ has received diagnostic information from a fault-free node specifying that $n_i$ has tested $n_j$ and found it to be fault-free. Table 1 shows the TESTED_UP$_2$ array maintained at $n_2$ for an eight node system with $n_1$, $n_4$, $n_5$ faulty. Note that "x" represents an entry that is arbitrary.

TABLE 1

| Data Structure Maintained At Node N$_2$. |
|---|
| TESTED_UP$_2$[0] = 2 |
| TESTED_UP$_2$[1] = x |
| TESTED_UP$_2$[2] = 3 |
| TESTED_UP$_2$[3] = 6 |
| TESTED_UP$_2$[4] = x |
| TESTED_UP$_2$[5] = x |
| TESTED_UP$_2$[6] = 7 |
| TESTED_UP$_2$[7] = 0 |

The Adaptive DSD algorithm operates at each node by first identifying another unique fault-free node and then updating local diagnostic information with information from that node. Functionally, this is accomplished as follows. List the nodes in sequential order, as $(n_0, n_1, \ldots n_{N-1})$. Node $n_x$ identifies the next sequential fault-free node in the list. This is accomplished at $n_x$ by sequentially testing consecutive nodes $n_{x+1}$, $n_{x+2}$, etc., until a fault-free node is found. Diagnostic information received from the fault-free tested node is assumed to be valid and is utilized to update local information. All addition is modulo N so that the last fault-free node in the ordered list will identify the first fault-free node in the list.

TABLE 2

| The Adaptive DSD Algorithm. |
|---|
| /* ADAPTIVE_DSD */ |
| /* The following is executed at each $n_x$, $0 \leq X \leq N-1$ */ |
| /* at predefined testing intervals. */ |
| 1. y=x; |
| 2. repeat [ |
| 2.1.     y=(y+1)$_{mod[N]}$; |
| 2.2.     request $n_y$ to forward TESTED_UP$_y$ to $n_x$; |
| 2.3.     ] until ($n_x$tests $n_y$ as "fault-free"); |
| 3. TESTED_UP$_x$[x]=y; |
| 4. for i=0 to N-1 |
| 4.1.   if (i=x) |
| 4.1.1.     TESTED_UP$_x$[i] = TESTED_UP$_y$[i]; |

Table 2 presents the Adaptive DSD algorithm. The algorithm is executed at each node $n_x$ at predefined testing intervals. Instructions 1 and 2 identify $n_y$ as the first fault-free node after $n_x$ in the ordered node list. The test at Step 2.3 evaluates to "fault-free" if $n_y$ has remained fault-free since the last test by $n_x$, including the period required for $n_y$ to forward TESTED_UP$_y$ in Step 2.2. This ensures that the diagnostic information included in TESTED_UP$_y$ received at Step 2.2 is accurate. Instructions 3 and 4 update the local diagnostic information dependent on both the fault-free test of $n_y$ and the diagnostic information received from $n_y$. Instruction 3 asserts TESTED_UP$_x$[x]=y, which specifies that $n_x$ has tested $n_y$ and determined it to be fault-free. In Instruction 4, all other elements of TESTED_UP$_x$ are updated to the values of TESTED_UP$_y$. Thus, the diagnostic information contained in the TESTED_UP arrays is forwarded between nodes in the reverse direction of tests. In this example, the information is forwarded from $n_y$ to $n_x$. Note that Step 4.1 prevents a node from replacing diagnostic information that it determines through normal testing procedures with information that it receives from other fault-free nodes.

Figure 3:
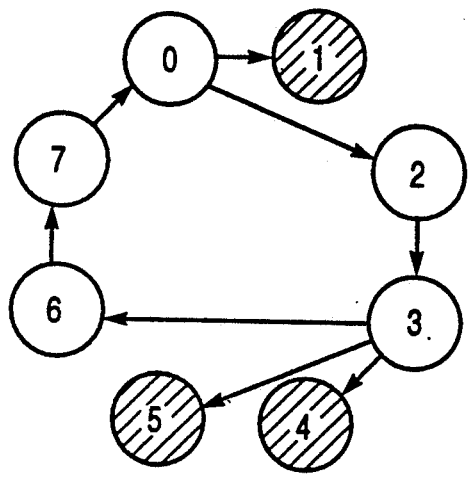
FIG. 3 is a schematic representation of an example system S and tests set T(S).

Since $n_x$ continues testing nodes in Step 2 until a fault-free node is found, the test set T(S) is dependent on the fault situation, F(S). The test set T(S) of an example system of eight nodes is shown in FIG. 3. In the example, $n_1$, $n_4$ and $n_5$ are faulty. The Adaptive DSD algorithm specifies that a node sequentially tests consecutive nodes until a fault-free node is identified. For example, $n_0$ tests $n_1$, finds it to be faulty and continues testing. Subsequently, $n_0$ tests node $n_2$, finds it to be fault-free and stops testing. Node $n_2$ finds $n_3$ to be fault-free and stops testing immediately. Node $n_3$ must test three nodes before it tests a fault-free node. The TESTED_UP$_2$ array maintained at $n_2$ for this example is shown in Table 1.

Diagnosis is accomplished at any node by following the fault-free paths from that node to other fault-free nodes. The Diagnose algorithm to be executed by a node $n_x$, is given in Table 3. The algorithm utilizes the information stored in TESTED_UP$_x$ to determine its diagnosis of the system. Its results are stored in array STATE$_x$, where STATE$_x$[i] is one of [fault-free, faulty]. For correct diagnosis, STATE$_x$[i] must equal $s_i$ for all i. The Diagnose algorithm utilizes the fault-free entries of TESTED_UP$_x$ and operates as follows. Initially, all nodes are identified as faulty in Step 1. In Step 2, node_pointer is initially set to x, the identifier of the node executing Diagnose. Step 3 of the algorithm traverses the forward fault-free paths in T(S), labeling each of the nodes as fault-free. This accomplished by setting $STATE_x[node\_pointer]$ to fault-free and then, setting $node\_pointer$ to $TESTED\_UP_x$-[node_pointer], which identifies the next sequential fault-free node in V(S). Step 3 is continued until node_pointer is set to every fault-free node and returns to x.

TABLE 3

The Diagnose Algorithm.

|  |  |  |
|---|---|---|
|  | /* DIAGNOSE | */ |
|  | /* The following is executed at each $n_x$, $0 \leq X \leq N-1$ | */ |
|  | /* when $n_x$ desires diagnosis of the system. | */ |
| 1. | for i=0 to N-1 |  |
| 1.1. | $STATE_x[i]$=faulty; |  |
| 2. | node_pointer=x; |  |
| 3. | repeat [ |  |
| 3.1. | $STATE_x[node\_pointer]$=fault free; |  |
| 3.2. | node_pointer $TESTED\_UP_x[node\_pointer]$; |  |
| 3.3. | ] until (node_pointer==x); |  |

The Adaptive DSD algorithm represents considerable improvements over previous distributed diagnosis algorithms in terms of diagnosability and the number of tests required. The Adaptive DSD algorithm requires N tests and is optimal since each node must be tested by one fault-free node. In addition, all fault sets can be diagnosed, including up to N−1 faulty nodes. The remaining fault-free nodes can always form a directed cycle of fault-free tests, and thus can identify all fault-free nodes. The SELF algorithms [6,1] require Nt tests to diagnose all possible fault sets including at most t faulty nodes.

Figure 4:
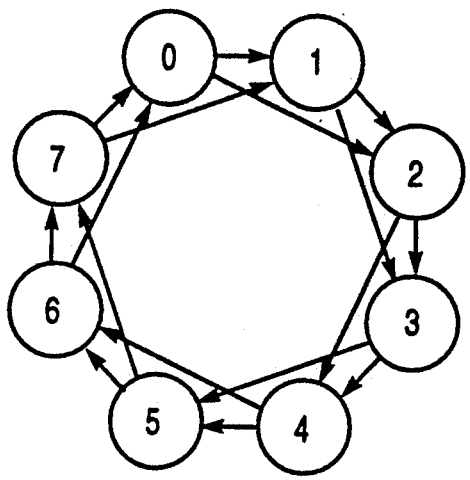
FIG. 4 is a schematic representation of an example system S consisting of eight nodes with $T(S)=D_{1,t+1}$.

Other work in system-level diagnosis; E. Kreutzer and S. L. Hakimi. System-Level Fault Diagnosis: A Survey. *Euromicro Journal* 20(4,5):323-330, May 1987 and distributed diagnosis; S. H. Hosseini, J. G. Kuhl and S. M. Reddy. A Diagnosis Algorithm for Distributed Computing Systems with Dynamic Failure and Repair. *IEEE Transactions on Computers* C-33(3):223-233, March, 1984, assumes a bound on the total number of faulty nodes. Consider a system S of N nodes, at most t<N/2 of which are faulty. In Adaptive DSD, each node sequentially tests consecutive nodes until a fault-free node is identified. If at most t nodes can be faulty, then any node will test at most t+1 nodes to find a fault-free node. FIG. 4 illustrates the graph $D_{1,2}$ presented in F. P. Preparata, G. Metze and R. T. Chien. On the Connection Assignment Problem of Diagnosable Systems. *IEEE Transactions on Electronic Computing* EC-16(12):848-854, December, 1967, on eight nodes, which consists of eight nodes and two forward arcs from each node to the next two sequential nodes. In Section 3.2, it is proven that if a system S is fully connected, i.e. $E(S)=E(K_N)$, then Adaptive DSD can diagnose N−1 failures. Given that at most t nodes can be faulty, the testing topology, T(S), of system S will always be a subset of $D_{1,t+1}$. Thus the $E(S)=E(K_N)$ requirement can be reduced to $D_{1,t+1}$ with non-directed edges, or $E(S)=E(H_{m,n})$ as shown in J. A. Bondy and U. S. R. Murty. *Graph Theory and Applications*. Elsevier North Holland, Inc., New York, N.Y., 1976, where m=N and n=t+1. Thus, for a system with N nodes and at most t failures, the communication topology, E(S), must include $E(H_{N,t+1})$, i.e., $E(H_{N,t+1}) \leq E(S)$.

Previous work in adaptive system-level diagnosis, E. Schmeichel, S. L. Hakimi, M. Otsuka and G. Sullivan. A Parallel Fault Identification Algorithm. *Journal of Algorithms* (11), June 1990; S. L. Hakimi and E. F. Schmeichel. An Adaptive Algorithm for System Level Diagnosis. *Journal of Algorithms* (5), June, 1984 assumes that an external observer desires the diagnosis of the network. The observer is unable to test the nodes of the system, but can request the outcome of test results. Typically, the observer first identifies a single fault-free node, and then utilizes that node to determine the state of the remaining nodes. An algorithm can be specified for the central observer that models the distributed Adaptive DSD algorithm. The algorithm specifies that each node sequentially test consecutive nodes until it finds a fault-free node. If any node determines the subsequent t nodes to be faulty, the observer assumes that the test of the next node will be fault-free. At completion, the largest cycle consisting of fault-free tests contains all of the fault-free nodes. This algorithm requires no more than N+Ft tests, where t is the maximum number of faults permitted and N is the number of nodes, of which F are faulty. This is shown since each node is tested once by a fault-free node and each faulty node can test up to t nodes each.

In addition, testing is specified to occur in rounds, allowing a node to either test or be tested in a single round. The tests required in a given round are adaptively chosen utilizing the test results from previous rounds. The Adaptive DSD testing scheme can be specified in "testing stages" where each node is allowed to test and be tested in a single stage. In stage i, $1 \leq i \leq t$, each $n_x$ tests $n_{x+i}$ if all previous test results reported by $n_x$ were faulty. This algorithm requires at most t testing stages. Since the testing topology specified in each stage is a directed cycle, each stage can be specified in at most 3 rounds. They are the even cycle edges; the odd cycle edges; the last edge, if an odd cycle. Thus, the number of testing rounds is at most 3t.

The Adaptive DSD algorithm is optimal in terms of the total number of tests required. Several implementation enhancements are presented herein to reduce other algorithm resource requirements and increase performance. The first enhancement addresses the transient behavior of the algorithm. Although the algorithm is guaranteed to converge to the correct diagnosis, incorrect transient diagnosis is possible during the convergence period due to delays in real systems. The enhancement ensures correct transient diagnosis during the convergence period by the addition of a temporary extra test for each node whose state changes from faulty to fault-free. The second enhancement concerns non-test related communication overhead. Diagnostic information can be reduced for nodes whose state changes infrequently. The third enhancement concerns diagnosis latency, or the time required for the nodes to reach a correct diagnosis after a fault event. In this scheme, internode communication and tests are driven by system fault events, in addition to periodic tests. Finally, asymmetric information forwarding is presented to further reduce diagnosis latency.

The Adaptive DSD algorithm yields provably correct diagnosis after N testing rounds following a fault event. However, correct diagnosis is not guaranteed during the N testing rounds immediately following the fault event. The problem occurs when faulty nodes are repaired and become fault-free. The newly repaired node requires a finite period to identify a single fault-free node, where the node reports invalid diagnostic information. This situation is identified by a break in the testing cycle in T(S). This problem is aggravated in actual systems where the newly repaired node requires an appreciable amount of time to identify a fault-free node.

FIG. 5 illustrates a node failure sequence. In FIG. 5a, all system nodes are fault-free. Node $n_3$ fails in FIG. 5b. Node $n_2$ then begins testing $n_4$. The cycle of fault-free nodes is maintained, and the diagnostic information remains valid.

FIG. 6 illustrates a node repair sequence that exhibits incorrect transient diagnosis. Node $n_3$ is faulty in FIG. 6a, requiring $n_2$ to test $n_3$ and $n_4$. Node $n_2$ detects that $n_3$ is repaired in FIG. 6b and begins testing only $n_3$. However, if $n_3$ has not yet tested $n_4$ then TESTED_UP$_3$ is invalid. This causes a break in the testing cycle T(S). Since the Diagnose algorithm follows fault-free paths in T(S) it will determine an incorrect diagnosis of the fault situation. In FIG. 6c, $n_3$ determines $n_4$ to be fault-free, thus restoring the testing cycle in T(S). At this time, the Diagnose algorithm correctly diagnoses the fault situation. This problem is avoided by requiring additional temporary tests by the Adaptive DSD algorithm.

Examine the fault event sequence in FIG. 7. Node $n_3$ is faulty in FIG. 7a and repaired in FIG. 7b. As shown, $n_2$ continues to test both $n_3$ and $n_4$ until information is received by $n_2$ that $n_3$ tests $n_4$. During this time, $n_2$ reports both nodes to be fault-free by specifying TESTED_UP$_2$[2]=[3 4]. In FIG. 7c, $n_3$ begins testing $n_4$ and receives valid diagnostic information. Subsequently, as shown in FIG. 7d, $n_2$ can stop testing $n_4$ and reports TESTED_UP$_2$[2]=[3]. A cycle is maintained in T(S) for the entire fault event sequence shown in FIG. 7. Thus Diagnose correctly diagnoses the fault condition of the system at any instance during the sequence.

This feature requires modification to both the Adaptive DSD and Diagnose algorithms. Adaptive DSD is modified to accept a list of node identifiers for each entry of the TESTED_UP array. In addition, Adaptive DSD executed at $n_i$ is modified to initialize TESTED_UP$_i$[i]=i at program initialization to identify that $n_i$ can only identify itself as fault-free. The Diagnose algorithm is rewritten as a recursive function at Step 3.2 so that node_pointer is set to all of the entries in the TESTED_UP array. Step 3.3 is rewritten to identify either node_pointer=x, or TESTED_UP$_i$[i]=i as terminating conditions.

Although the Adaptive DSD algorithm is optimal in terms of test count, it requires more than the minimum number of diagnostic messages. After two testing rounds of Adaptive DSD, TESTED_UP$_w$[x]=y. The value remains constant for testing rounds 3 through N. However, $n_w$ receives TESTED_UP$_x$[x]=y from $n_x$ for testing rounds 3 through N and uses it to update TESTED_UP$_w$[x] to the same value. In real systems, it is wasteful to utilize network resources to communicate duplicated information between nodes. A time stamping scheme like that presented in R. P. Bianchini Jr., K. Goodwin and D. S. Nydick. Practical Application and Implementation of Distributed System-Level Diagnosis Theory. In *Proceedings of the Twentieth International Symposium on Fault-Tolerant Computing*, pages 332–339. IEEE, June, 1990, is employed to permit nodes to transfer new diagnosis information only during Step 2.2 of Adaptive DSD. The total message count is minimized using this scheme. Each node receives a single message for every change in TESTED_UP, and is thus minimum and optimal.

Each node, $n_x$, maintains a local time stamp, $ts_x$. Adaptive DSD records the time stamp at each entry of TESTED_UP$_x$. Assume a new entry arrives to be inserted into TESTED_UP$_x$[y]. Then $ts_x$ is incremented and recorded with the new TESTED_UP$_x$[y]. When $n_w$ requests diagnostic information from $n_x$, it sends $ts'_x$ representing the time stamp at $n_x$ when $n_w$ last requested to be updated. Node $n_x$ simply forwards the entries of TESTED_UP$_x$ that have time stamps larger that $ts'_x$. Examine the following testing sequence example:

1. $n_i$ tests $n_j$ as fault-free,
2. $n_i$ sends request($ts_j$=0) to $n_j$, $n_i$ receives $ts_j$=20 and entire TESTED_UP$_j$.
3. $n_i$ tests $n_j$ as fault-free, n assumes above information valid.
4. $n_i$ sends request($ts_j$=20) to $n_j$, $n_i$ receives $ts_j$=30 and TESTED_UP$_j$ modified since $ts_j$=20.
5. $n_i$ tests $n_j$ as fault-free, $n_i$ assumes above information valid.

The first time $n_i$ requests information from $n_j$ in Step 2, it forwards $ts_j$32 0. This ensures that $n_j$ forwards every entry of TESTED_UP$_j$. Node $n_j$ returns its current time stamp, $ts_j$=20. The second time $n_i$ requests information from $n_j$ in Step 4, it forwards $ts_j$=20. Node $n_j$ forwards all entries in TESTED_UP$_j$ that have time stamps greater than 20, and returns the current $ts_j$=30. In this manner, only new diagnostic information is forwarded from $n_j$ to $n_i$. A scheme is employed as shown in S. H. Hosseini, J. G. Kuhl and S. M. Reddy. A Diagnosis Algorithm for Distributed Computing Systems with Dynamic Failure and Repair. *IEEE Transactions on Computers* C-33(3):223–233, March, 1984, to ensure that the time stamps do not grow unbounded.

This enhancement addresses the diagnosis latency of the algorithm and assumes the information updating enhancement. When a new diagnostic message arrives at $n_x$, $n_x$ stores the message in TESTED_UP$_x$. At this time, $n_x$ can determine correct diagnosis. Currently, the new information is not forwarded until a request for the information arrives from another node. However, if $n_x$ can identify the node that the message will be forwarded to, it can forward the message when it arrives. This scheme is termed Event Driven since information is forwarded when the event occurs. In the previous algorithm, information is forwarded only on request.

Event Driven Adaptive DSD is implemented by adding a new array FORWARD_TO$_x$. New information arriving at $n_x$ is forwarded to all the nodes in FORWARD_TO$_x$. Upon receiving the new information, these nodes immediately test $n_x$ to validate it.

The number of messages remains the same as the information updating scheme, however, diagnosis latency is reduced. In the previous algorithms, new information is stored at each node until other nodes request the diagnostic information. In this algorithm, the new information is forwarded immediately. A detailed analysis of the diagnosis latency is given below.

Asymmetric information forwarding further reduces the diagnosis latency by forwarding diagnosis information along redundant communication paths, different from those utilized for testing. Different information forwarding schemes are illustrated in FIG. 8. Tests are identified by shaded arcs and diagnostic information is forwarded along solid arcs. The original Adaptive DSD algorithm is illustrated in FIG. 4–4a. Diagnosis information is forwarded only in the reverse direction of the system tests. In the figure, $n_0$ tests $n_1$ and detects it to have failed. Subsequently, $n_0$ tests $n_2$, determines it to be fault-free, then forwards that diagnostic information along the solid arc to $n_7$. The diagnostic information traverses six arcs before it reaches $n_2$.

Figure 8A:
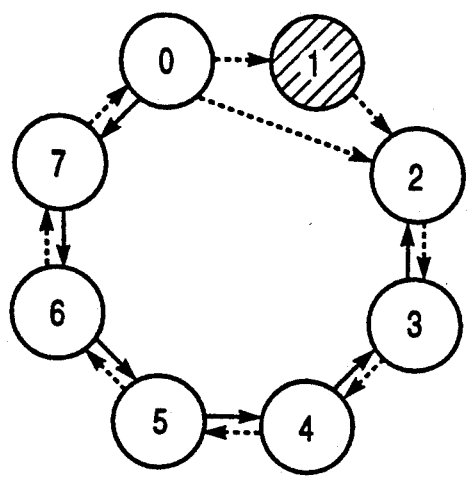
FIGS. 8a, 8b, and 8c are schematic representations of different information forwarding schemes.
Figure 8B:
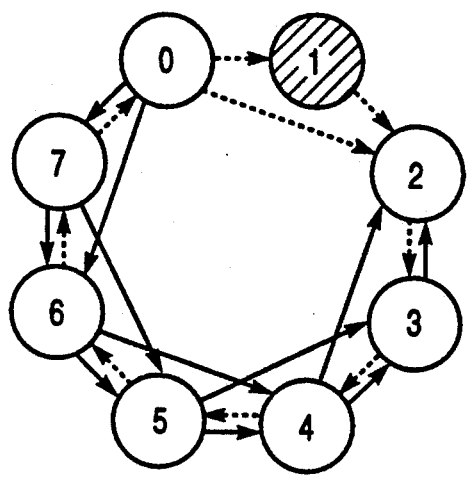
Figure 8C:
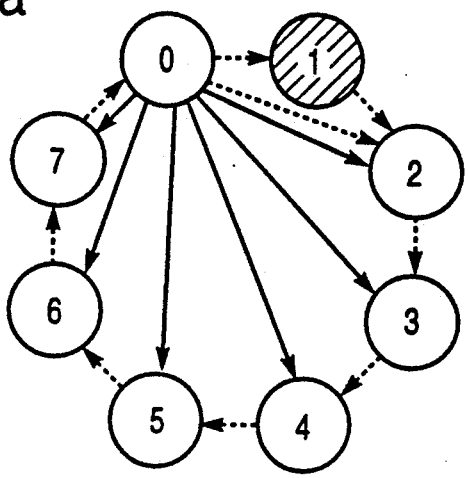

The different information forwarding schemes illustrated in FIG. 8 optimize different system parameters. Three forwarding schemes are illustrated for the event of $n_0$ detecting $n_1$ as faulty. FIG. 8a, as presented above, illustrates symmetric forwarding. This scheme requires the lowest number of diagnosis information messages forwarded from each node and the highest diagnosis latency. The forwarding scheme utilized by the SELF algorithms is illustrated in FIG. 8b. Each node forwards diagnosis information to t other nodes. The scheme illustrated in FIG. 8c requires high message count at $n_0$ but has the minimum diagnosis latency of one message delay.

Figure 9:
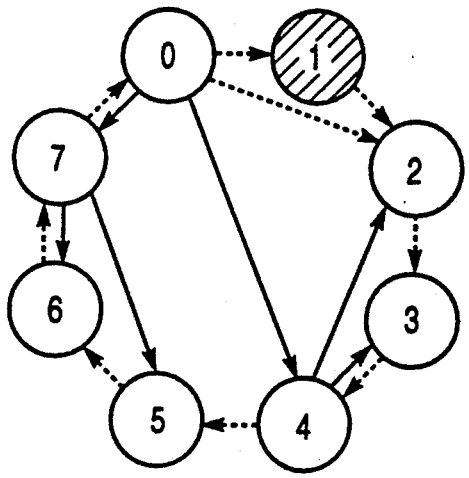
FIG. 9 is a schematic representation of an asymmetric information forwarding scheme for faulted $N_1$.

The asymmetric information forwarding scheme utilized the final implementation of Adaptive DSD is illustrated in FIG. 9. Using this scheme, $n_0$ forwards the diagnostic information to $n_4$ and $n_7$. Nodes $n_4$ and $n_7$ each forward the information to two additional nodes. In this implementation, the information forwarded along the solid arcs requires only two arcs to reach $n_2$. The structure represented by the solid arcs is a binary tree. The longest path in a binary tree is $\log_2 N$. A binary tree is chosen as the forwarding structure since it requires that half of the nodes forward only one additional diagnostic message, yet reduces the path length a diagnostic message must travel from N to $\log_2 N$.

Table 4 classifies recent distributed system diagnosis algorithms. The algorithms are classified by two orthogonal characteristics. The columns distinguish between adaptive and non-adaptive algorithms. Column A identifies non-adaptive algorithms and Column B identifies the adaptive algorithms specified herein. The rows identify the diagnostic information handling scheme employed by the algorithms. Row 1 identifies algorithms that forward all diagnostic information in every algorithm testing round. Row 2 identifies algorithms that only forward information that has changed since the previous testing round. Row 3 identifies the most complicated information handling scheme, which involves using fault events to forward information rather than testing rounds. The algorithm identified in Row 4 forwards diagnosis information along different communication paths than those utilized for testing.

TABLE 4

Distributed System Diagnosis Algorithm Classification.
Algorithm Classification

| | A. Non-Adaptive | B. Adaptive |
|---|---|---|
| 1. All Diagnosis Information | NEW_SELF | Adaptive DSD |
| 2. Diagnosis Information Updating | (none) | Adaptive DSD W/Update |
| 3. Event Driven Diagnosis Information | EVENT_SELF | Event Driven Adaptive DSD |
| 4. Asymmetric Diagnosis Information Forwarding | (none) | Asymmetric Event Driven Adaptive DSD |

Table 5(a) shows the diagnosability of the algorithms. Algroithm diagnosability is the maximum number of faulty nodes that are permitted for the algorithm to maintain correct diagnosis. The diagnosability of the SELF algorithms is predefined before algorithm execution, and is t. The testing topology is fixed prior to algorithm execution and is determined by t. The diagnosability of the Adaptive DSD algorithms is $N-1$, which specifies that any set of faulty nodes is acceptable. The remaining fault-free nodes will always determine correct diagnosis.

TABLE 5

Algorithm Diagnosability and Test Count.

| | Algorithm Diagnosability | |
|---|---|---|
| | SELF Algorithms | Adaptive DSD |
| All Information Forwarding Schemes | t | N-1 |

(a)

| | Test count Per Testing Round | |
|---|---|---|
| | SELF Algorithms | Adaptive DSD |
| All Information Forwarding Schemes | Nt | N |

(b)

Table 5(b) shows the number of tests required by each algorithm. The SELF algorithms require Nt tests since each node must be tested by t other nodes. The Adaptive algorithms require N tests. Since every node of any distributed diagnosis system must be tested by one of the fault-free nodes, N is the minimum number of tests possible. Thus, Adaptive DSD is optimal in terms of the number of tests required.

Table 6 identifies the number of messages that contain algorithm diagnostic information. In the SELF algorithms, each message contains the triple, (A, B, C), where A, B, and C are node identifiers. The Adaptive DSD algorithm requires that each TESTED_UP array gets forwarded in a testing round. Thus N messages of size N are required and recorded as $N^2$ in Table 6. The message counts of the event driven and information updating schemes are functions of the number of fault events. Identify f as the number of faulty nodes, and $\Delta f$ as the change in the number of faulty nodes, or fault events. Adaptive DSD with information updating forwards each $\Delta f$ fault event to each node, thus the total message count is $N\Delta f$. The message count is optimal since each node must receive at least one message for each fault event. This message count is the same for Event Driven Adaptive DSD. The asymmetric forwarding algorithm requires $1.5N\Delta f$ messages since it forwards diagnosis information along redundant paths.

TABLE 6

Algorithm Message Count.
Message Count Per Testing Round

| | SELF Algorithms | Adaptive DSD |
|---|---|---|
| All Information | $O(N^2 t^2)$ | $N^2$ |
| Information Updating | — | $N \Delta f$ |
| Event Driven | $O(N \Delta f t^2)$ | $N \Delta f$ |
| Asymmetric Forwarding | — | $1.5N \Delta f$ |

Table 7 identifies the diagnosis latency of each algorithm. The diagnosis latency is the time required for all fault-free nodes in the diagnosis system to reach a correct diagnosis after a fault event. Adaptive DSD requires N testing rounds to get new diagnostic information to every node. Thus, the diagnosis latency is $N(T_r)$, where $T_r$ represents the time of a testing round. The SELF algorithms require $N/t+1$ testing rounds since there are multiple paths between nodes in the test set, including paths of length $N/t+1$. The diagnostic messages require less time to be forwarded to all nodes in the system.

TABLE 7
Algorithm Diagnosis Latency.
Worst Case Diagnosis Latency

| | SELF Algorithms | Adaptive DSD |
|---|---|---|
| All Information | $N/_t + 1\ (T_t)$ | $N\ (T_t)$ |
| Information Updating | — | $N\ (T_t)$ |
| Event Driven | $N/_t + 1\ (T_{test})$ | $N\ (T_{test})$ |
| Asymmetric Forwarding | — | $\log_2 N\ (T_{test})$ |

The event driven algorithms have significantly reduced diagnosis latency. In the non-event driven algorithms, the diagnostic information arrives at a node and is not forwarded until the information is requested during the next testing round. In the event driven schemes, the node receiving the information immediately validates it by testing the node that forwarded the information. Once validated, the information is immediately forwarded to subsequent nodes. Thus, the information is forwarded after the time required for a fault-free test, $T_{test}$, which is significantly less than a testing cycle in our implementation. The asymmetric adaptive algorithm further reduces diagnosis latency by utilizing redundant shorter paths, the longest of which contains $\log_2 N$ nodes.

In the operation of the preferred embodiment, Adaptive DSD has been running in the CMU ECE department since November 1990 on various workstations using the Ultrix operating system, including VAX and DEC 3100 RISC workstations. The algorithm consists of approximately 3000 lines of C code, written in modular form to make it easily portable. The network interface for this implementation uses the Berkeley socket interface; *UNIX Programmer's Manual: Socket* The University of California at Berkeley, 1986, and presently supports Ethernet IP/UDP protocols, *The Ethernet: A Local Area Network* 2.0 edition, Digital Equiptment Corp., Intel Corp., Xerox Corp., 1982. Data Link Layer and Physical Layer Specifications; J. B. Postel. *Internet Protocol.* Technical Report, NSF-Net RFC #791, September 1981. Appropriate modifications to the network module will allow the program to run on any system that has a C compiler.

Adaptive DSD, like its predecessor EVENT_SELF, R. P. Bianchini Jr., K. Goodwin and D. S. Nydick. Practical Application and Implementation of Distributed System-Level Diagnosis Theory. In *Proceedings of the Twentieth International Symposium on Fault-Tolerant Computing,* pages 332–339. IEEE, June, 1990, is implemented as a modular, event-driven program. A configuration file is read by each workstation at startup that identifies the complete list of workstations participating in system diagnosis, as well a specifying a number of tuning parameters. Algorithm tuning parameters include the maximum number of forward tests in a single test interval, various timeout values, and flags that enable or disable certain options, such as packet bundling. An activity scheduler plays a significant role in the implementation by permitting events such as workstation tests, packet retransmissions, and other timeouts to be scheduled for execution at a specified time. As with EVENT_SELF, the workstation test is implemented as a separate program that is spawned as a subprocess to test several of the hardware facilities of the workstation.

Workstations participating in system diagnosis are initially sorted by Internet host address. Since this number is unique to each workstation, all workstations generate identical sorted lists. Testing occurs only in the forward direction of the sorted list; i.e. each workstation tests those workstations that follow it in the sorted list, modulo the number of workstations. Information forwarding occurs only in the reverse direction, or backwards in the sorted list. Due to Internet standard subnet routing, J. C. Mogul, J. B. Postel. *Internet Standard Subnetting Procedure.* Technical Report, NSF-Net RFC #950 August 1985 workstations with numerically similar host address will be located on a single subnet. The sorted arrangement of workstations tends to minimize the load on routers and bridges as a result of inter-subnet communication.

The initial startup of Adaptive DSD is a source of concern. Each node attempts to find and maintain a cycle among all other fault-free nodes. The first node started essentially tests every other node in the network searching for a fault-free node. There are several approaches to reduce the number of tests in this situation. The first permits the node to test every other node in the network. This provides rapid diagnosis convergence during startup, but results in unmanageable message traffic, especially when a large number of nodes are involved. An alternate approach is to have each node test one node in a test interval in sequence, until it finds a fault-free node. This approach results in slow diagnosis convergence, since a large number of testing intervals might be required for each node to find a fault-free node. The strategy employed is compromise of these two approaches. Each node tests a subset of the total number of nodes in the network per testing interval. If a maximum of m nodes can be tested in each test interval, then a fault-free cycle must be found in at most $N/m$ test intervals. This approach limits total algorithm communication to Nm tests per testing interval. The algorithm operation in the presence of many faulty nodes permits graceful degradation of diagnosis latency. If more than m consecutive nodes are faulty, only m of them will be tested per test interval.

Operation of the Adaptive DSD algorithm on the CMU ECE network focused on algorithm communication overhead, in terms of average packet count, and diagnosis latency, measured in seconds. FIGS. 10–15 graph the communication overhead as a function of experiment elapsed time. In addition, important events are marked, including fault occurrence and diagnosis.

Figure 10:
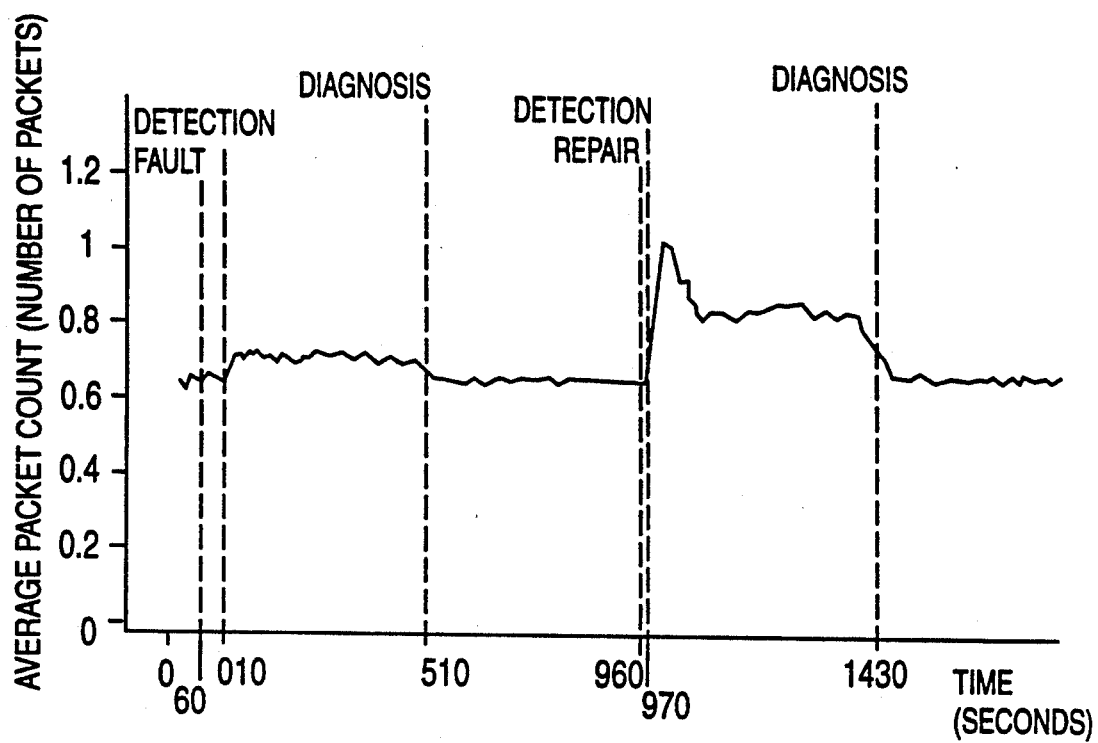
FIG. 10 is a graph depicting Scenario 1 on a 72-node testing network.
Figure 11:
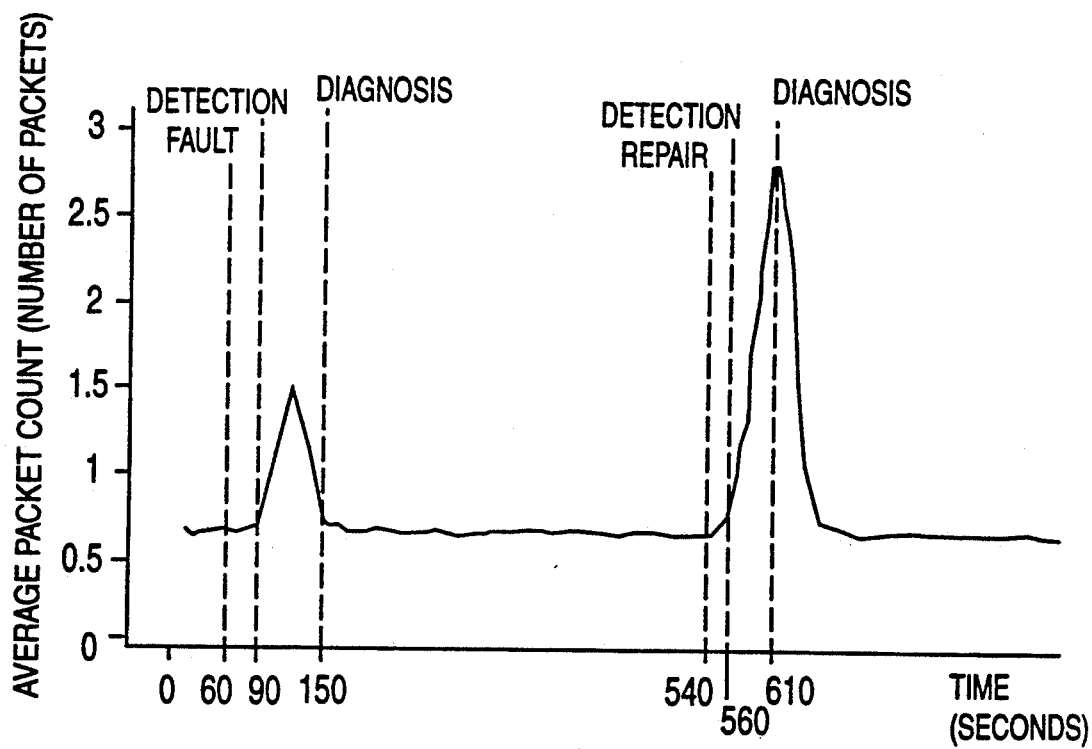
FIG. 11 is a graph depicting Scenario 2 on a 60-node testing network.
Figure 12:
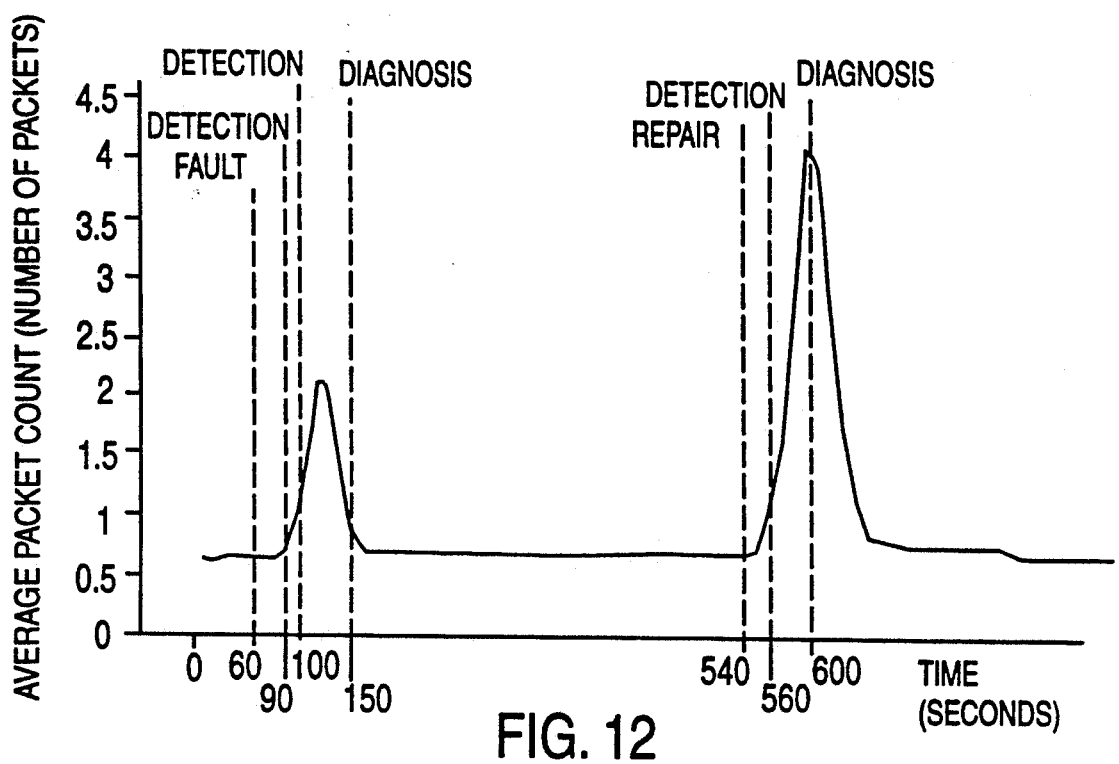
FIG. 12 is a graph depicting Scenario 3 on a 60-node testing network.
Figure 13:
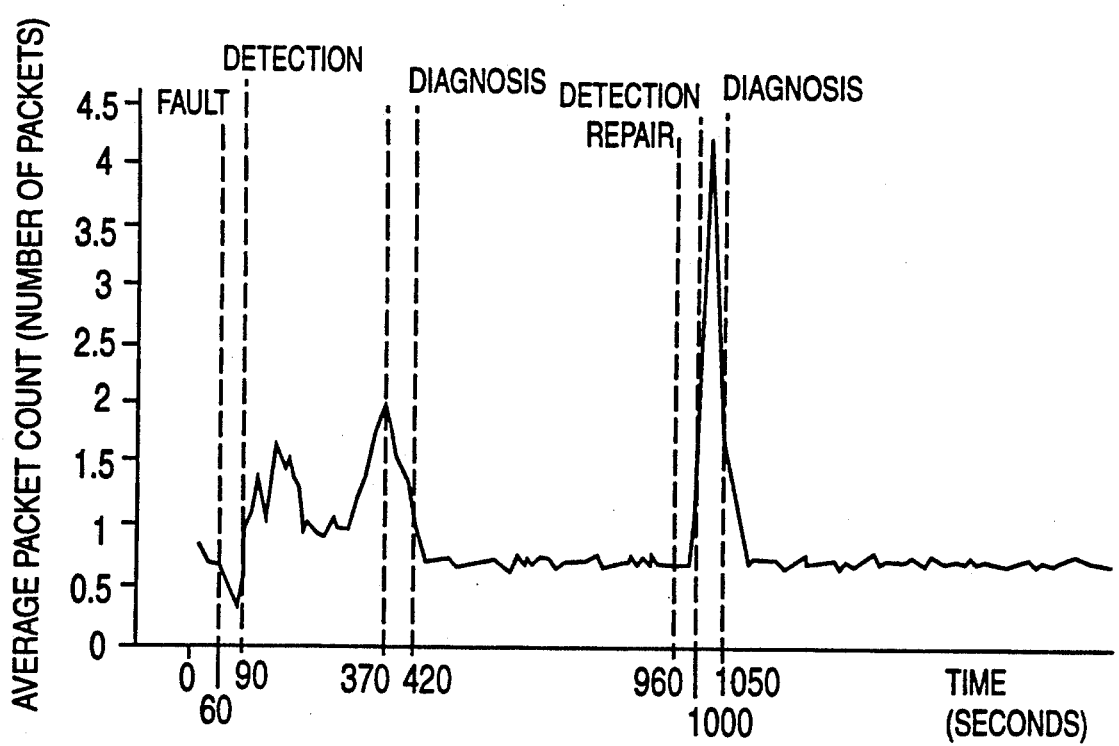
FIG. 13 is a graph depicting Scenario 4 on a 60-node testing network.

FIG. 10 illustrates the execution of the Adaptive DSD algorithm with symmetric information forwarding. FIGS. 11–13 illustrate the performance of the Adaptive DSD algorithm with asymmetric forwarding. In each scenario, the diagnosis system consists of 60 nodes and the algorithm executes with a 30 second test interval. Packet bundling is employed. To reduce the amount of message traffic generated by a node returning to the network from a failure, a maximum of m=5 forward tests per test interval are permitted. Every node maintains its own data collection for the packet counts shown in the figures, which is collected at ten-second intervals throughout each experiment.

Scenarios 1 and 2 demonstrate the difference between symmetric and asymmetric forwarding. See FIGS. 10 And 11. Both experiments involve the failure and subsequent recovery of a single node. Symmetric forwarding is utilized in Scenario 1 and asymmetric forwarding is utilized in Scenario 2. At 60 seconds during Scenario 1, a single node in the network fails. The faulted node is detected at 110 seconds, after it is tested and a test timeout period occurs. After 110 seconds, the fault information is forwarded to the remaining fault-free nodes.

Since diagnosis information is validated by testing, the fault information will reach the farthest node from the failure only after all nodes between it and the fault are tested and found to be fault-free. Thus, at time 510, the node farthest from the fault receives the information indicating the node failure. This results in an overall diagnosis latency of 450 seconds. After the failure is detected, the detecting node begins testing the nodes that the faulty node tested before its failure.

At 960 seconds the faulty node is repaired and returns to the network. The newly recovered node immediately performs forward tests up to the limit of five, as specified in the configuration file. This causes the sharp increase in packet count at time 960. At time 970, the recovered node is detected. This information is propagated backward through the path of fault-free nodes until it reaches the fault-free node farthest from the recovered node, at 1430 seconds. Correct diagnosis is achieved within 460 seconds. After 1430 seconds, the packet counts return to nominal levels.

As shown in Scenario 1, the diagnosis latency of Adaptive DSD with symmetric forwarding is a linear function of the number of system nodes and can be significant for large systems. Scenario 2, shown in FIG. 11, illustrates the same experiment with asymmetric forwarding. The diagnosis latency is significantly reduced. The diagnosis latency for the failure is 60 seconds for asymmetric forwarding versus 400 seconds for symmetric forwarding. The same diagnostic information is forwarded, except that it is forwarded closer to the fault event. This results in a higher peak message count with shorter duration. The same total messages are forwarded, but are forwarded throughout the network at a faster rate. The remaining experiment utilize asymmetric forwarding to provide faster diagnosis latencies.

Scenario 3, shown in FIG. 12, illustrates two distributed simultaneous failures in the network, followed by simultaneous recoveries. FIG. 12 illustrates similar behavior as the single node failure, with the exception of higher average packet counts following the recovery. This occurs since the two recovered nodes each request complete diagnostic information from all of the nodes they initially test when they return to the network. For Scenario 3, the diagnosis latency of the failure is 50 seconds and the diagnosis latency of the recovery is 40 seconds.

FIG. 13 illustrates one advantage of Adaptive DSD over both of the SELF algorithms: the ability to correctly diagnose the state of a network under the presence of many faults. In Scenario 4, 50 of the 60 nodes experience simultaneous failures at 60 seconds. The average packet count initially reduces significantly since fifty nodes cease transmitting messages. The first faulty node is detected at 90 seconds, and the fault-free nodes attempt to re-establish a circuit among the remaining fault-free nodes. Following the first detected failure, a small subset of the remaining fault-free nodes re-establish a cycle in the test set. At this time, complete diagnostic information is forwarded among these nodes. At time 370, the cycle is increased to include all remaining fault-free nodes and additional diagnostic information is exchanged. After the 360 second diagnosis latency, the packet counts reduce to their new nominal values. At time 960, one of the fifty failed nodes returns to the network. The usual recovery detection occurs, and diagnostic information is exchanged. After only 90 seconds, complete diagnosis among the fault-free nodes is established.

Figure 14:
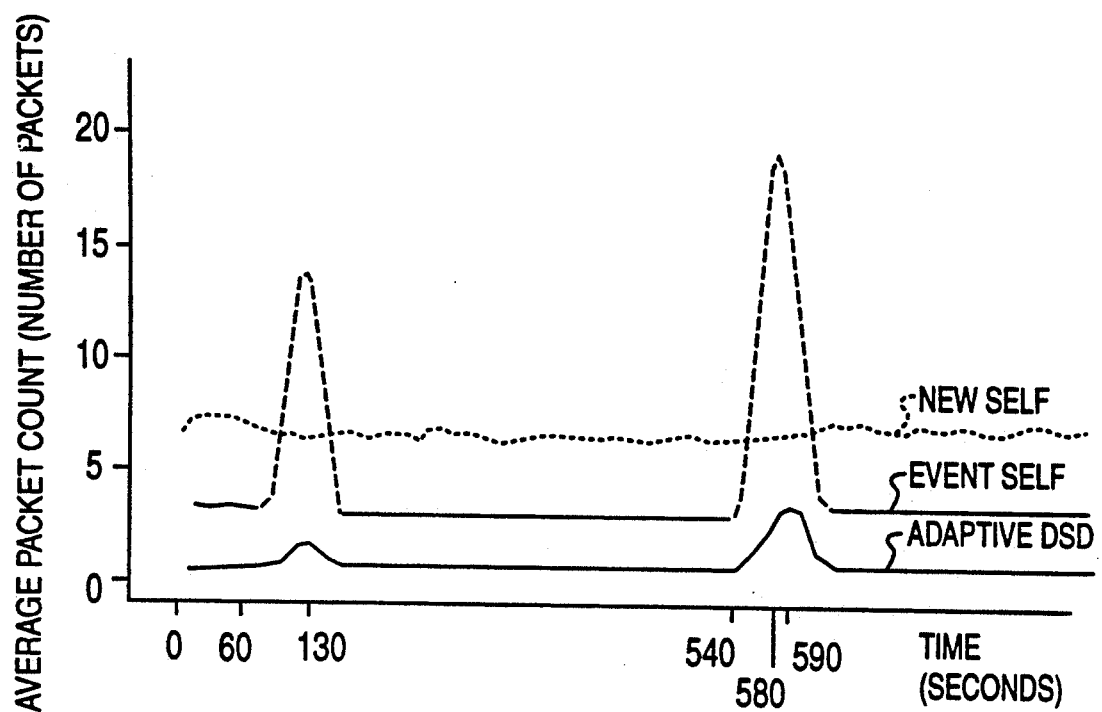
FIG. 14 is a graph depicting Scenario 5 on a 20-node testing network.
Figure 15:
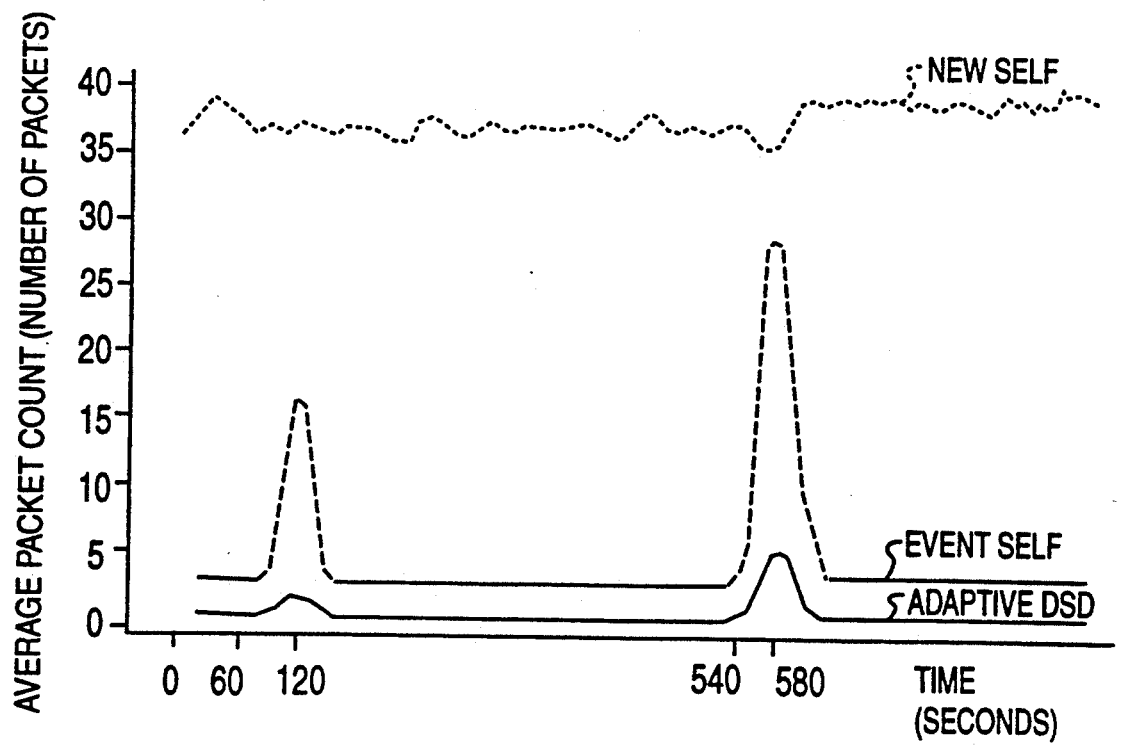
FIG. 15 is a graph depicting Scenario 6 on a 20-node testing network.

FIGS. 14 and 15 compare Adaptive DSD to the SELF algorithms for a single failure and subsequent recovery. Due to the high number of diagnostic messages generated by the NEW_SELF algorithm and the available network bandwidth, the diagnosis system is limited to twenty nodes. The algorithms executed in Scenario 5 shown in FIG. 14 use the same configuration parameters as the first three experiments: 30 second test interval, packet bundling, asymmetric forwarding, and a maximum of $m=5$ forward tests per test interval. Adaptive DSD has lower communication overhead and faster diagnosis latency. This is verified in Table 7.

Packet bundling is utilized in Scenarios 1 through 5 to reduce the total message count. Due to packet bundling, the packet counts do not reflect the actual number of diagnostic messages required by each algorithm. As shown in Table 6, the EVENT_SELF algorithm always requires fewer diagnostic messages than NEW_SELF. However, in FIG. 14, its average packet count exceeds that of NEW_SELF after a fault event. This occurs because EVENT_SELF forwards a single diagnostic message without bundling at each fault event. NEW_SELF only forwards the message concerning the event at the end of the next testing interval bundled with other diagnostic messages. To better illustrate the actual number of diagnostic messages, packet bundling is not utilized in Scenario 6. See FIG. 15. All other algorithm configuration parameters are maintained. As illustrated, Adaptive DSD requires fewer diagnostic messages than EVENT_SELF which in turn requires fewer diagnostic messages than NEW_SELF. The message counts in FIG. 15 reflect those calculated in Table 6.

The Adaptive DSD algorithm has been specified and implemented. Adaptive DSD represents considerable improvements over previous distributed diagnosis algorithms. The algorithm is optimal in terms of tile umber of tests, requiring N tests in each testing interval. The diagnosability of the algorithm is maximum and permits the fault-free nodes to diagnose any of up to $N-1$ faulty nodes. In the Event Driven Adaptive DSD algorithm the total message count is $N\Delta f$ and optimal. Each node receives one message for each fault event in the system.

The initial Adaptive DSD algorithm suffers from increased diagnosis delay, in part due to the optimization of total message count. Correct diagnosis requires that algorithmic messages traverse a path that includes all fault-free nodes. The asymmetric Adaptive DSD algorithm permits a direct tradeoff between message count and diagnosis delay. By specifying redundant paths for message forwarding, diagnosis delay is reduced at the expense of additional algorithmic messages. The asymmetric Adaptive DSD algorithm presented requires $1.5N \Delta f$ messages and has a diagnosis delay of $O(\log_2 N)$.

Since its inception at Carnegie Mellon, greater reliance has been placed on the DSD system by the system administrators. The current system is used to diagnose faulty workstations within a minute of failure. In addition, the system has been used to determine the cause of failures during the presence of increased fault activity.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An adaptive distributed system for fault tolerance comprising:

a network comprising N nodes, wherein N is an integer greater than or equal to 3, each of said nodes being in communication with every other node and capable of executing an algorithm, and wherein each node comprises a processor having testing means for testing whether another node is in a desired state of an undesired state and for choosing which other node to test, and wherein said testing means includes a memory and a computer program stored in said memory for choosing at least one other processor to test and for testing the at least one other processor, and wherein said computer program is comprised of the computer implemented steps of:

(a) testing another processor in the network in the immediate clockwise location with respect to the testing processor to determine whether the processor being tested is in a desired state or an undesired state;

(b) providing an activation signal to the processor being tested if it is in a desired state to cause it to activate its computer program;

(c) providing a signal to the other processors corresponding to the state of the processor being tested if it is in an undesired state; and (d) repeating steps (a) through (c) with another processor in the immediate clockwise location with respect to the last processor tested, said another processor being the tested processor instead if the last processor tested is in an undesired state and until a processor in a desired state is tested.

2. In a network comprising N nodes, where N is an integer greater than or equal to 3 and each of said nodes is capable of executing an algorithm, for carrying out a method for determining which nodes are in a desired state and which nodes are in an undesired state, said method comprising the steps of:

using a testing node to test another node in the network to the immediate clockwise location of the testing node to determine whether the node being tested is in a desired state or an undesired state;

(b) providing an activation signal to the node being tested if it is in a desired state to cause it to become the new testing node and repeating step (a) using the new testing node for said testing node;

(c) providing a signal to the other nodes corresponding to the state of the node being tested if it is in an undesired state; and (d) repeating steps (a) through (c) on another node to the immediate clockwise location of the last node tested if the last node tested is in an undesired state and until a node in a desired state is tested.

3. A method as described in claim 2 wherein the nodes are processors.

* * * * *